United States Patent

Varrichione

[11] Patent Number: 5,556,032
[45] Date of Patent: Sep. 17, 1996

[54] DUAL LEVEL WATERING DEVICE

[76] Inventor: Andy Varrichione, 1215 Clearview Dr., Port Charlotte, Fla. 33953

[21] Appl. No.: 453,458

[22] Filed: May 30, 1995

[51] Int. Cl.$^6$ .............................. B05B 15/06; B05B 1/14
[52] U.S. Cl. ..................... 239/279; 239/273; 239/553; 239/565
[58] Field of Search ..................... 239/273, 276, 239/279, 280, 280.5, 548, 550, 553, 553.3, 565; 248/80, 83

[56] References Cited

U.S. PATENT DOCUMENTS

| | | | |
|---|---|---|---|
| 1,103,786 | 7/1914 | Lewis | 239/754 |
| 1,192,551 | 7/1916 | Nelson | 239/276 X |
| 1,499,202 | 6/1924 | Coutu | 239/565 X |
| 1,962,263 | 6/1934 | Tracy | 239/276 X |
| 2,558,663 | 6/1951 | Olschewski | 239/565 X |
| 2,792,257 | 5/1957 | Davis | 239/276 |
| 2,874,995 | 2/1959 | Attwell | 239/276 X |
| 2,939,666 | 6/1960 | Ohre | 248/76 |
| 3,270,966 | 9/1966 | Ackley | 239/565 X |

FOREIGN PATENT DOCUMENTS

| 11472 | 1/1928 | Austria | 239/276 |
|---|---|---|---|

Primary Examiner—Andres Kashnikow
Assistant Examiner—Lesley D. Morris
Attorney, Agent, or Firm—Frank A. Lukasik

[57] ABSTRACT

A device for uniformly distributing as well as conserving water is provided. A main water supply line carries water to a main discharge header that has a plurality of outlets. The header includes at least a pair of conduits spaced to form at least two legs of a triangular support, each conduit having a flow restraining device which is disposed above but adjacent to the ground. The main header has a central restraining device of smaller diameter spaced from the ground to provide water and reduce the water pressure at the pair of outlets. The header preferably contains mesh filters or multiple screen filters which operate to restrain flow as well as to provide a uniform flow of water therethrough. A support arm is connected to the main water supply line at a swivel joint to form a supporting triangle, and a water control valve is positioned in the main water supply.

1 Claim, 7 Drawing Sheets

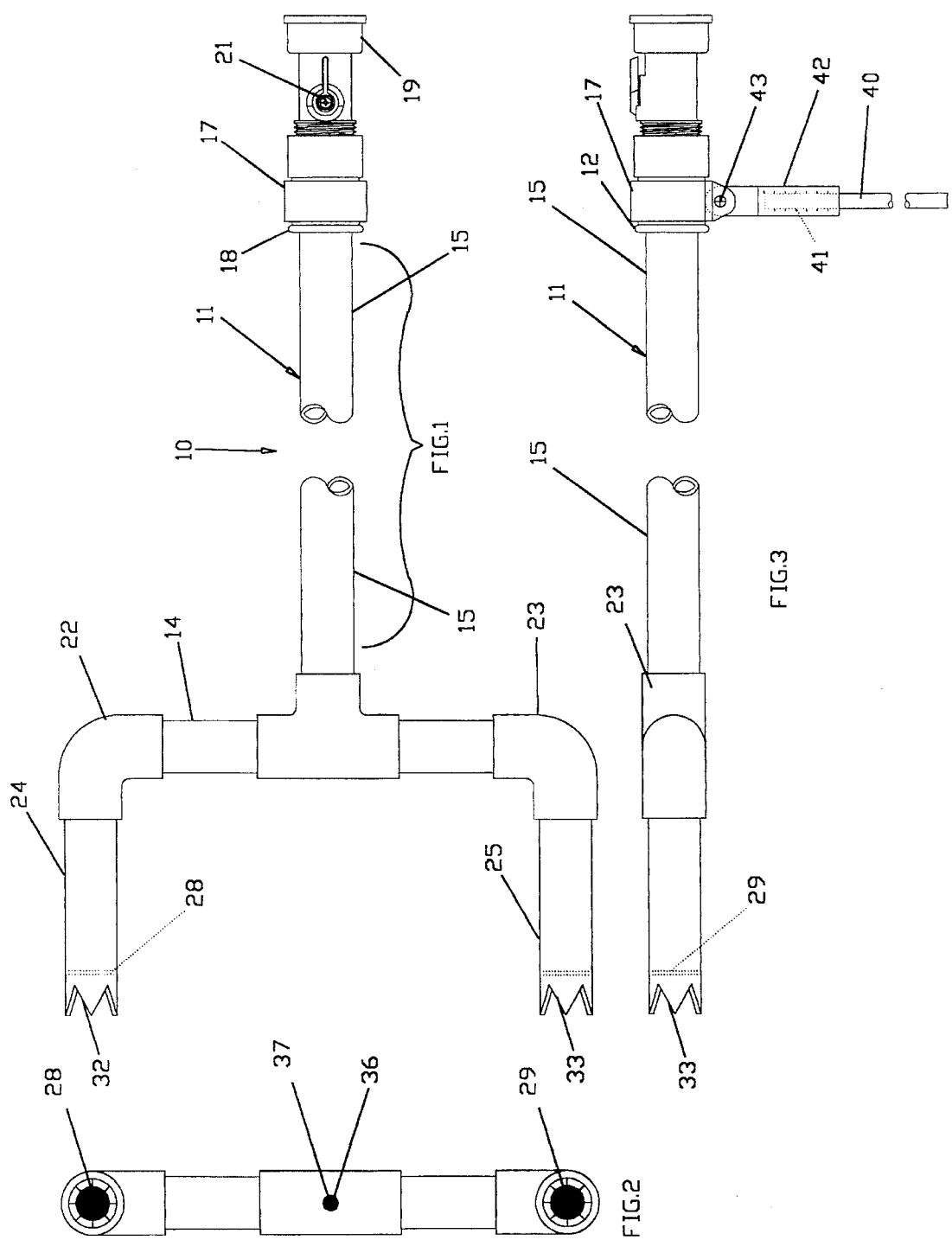

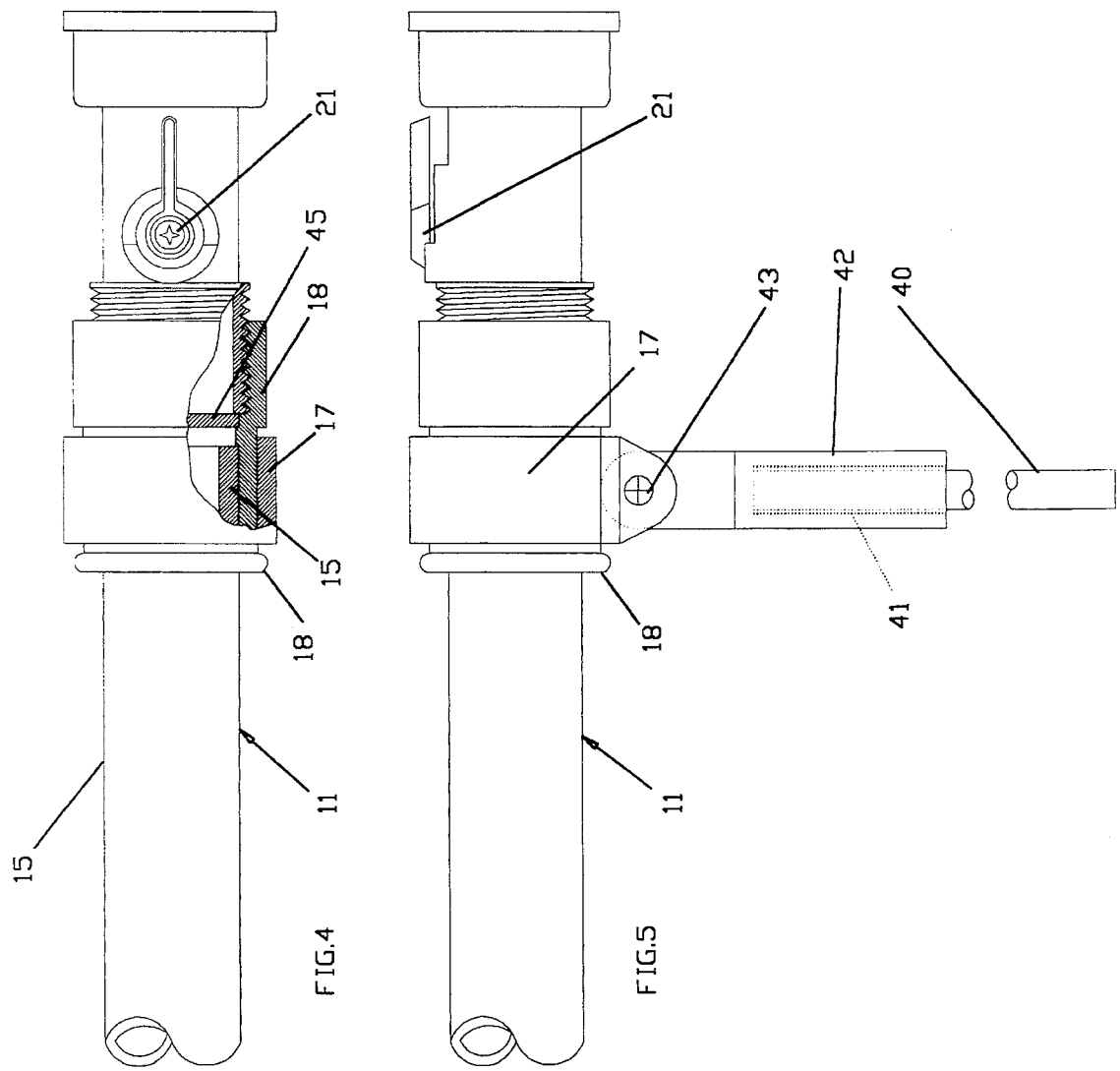

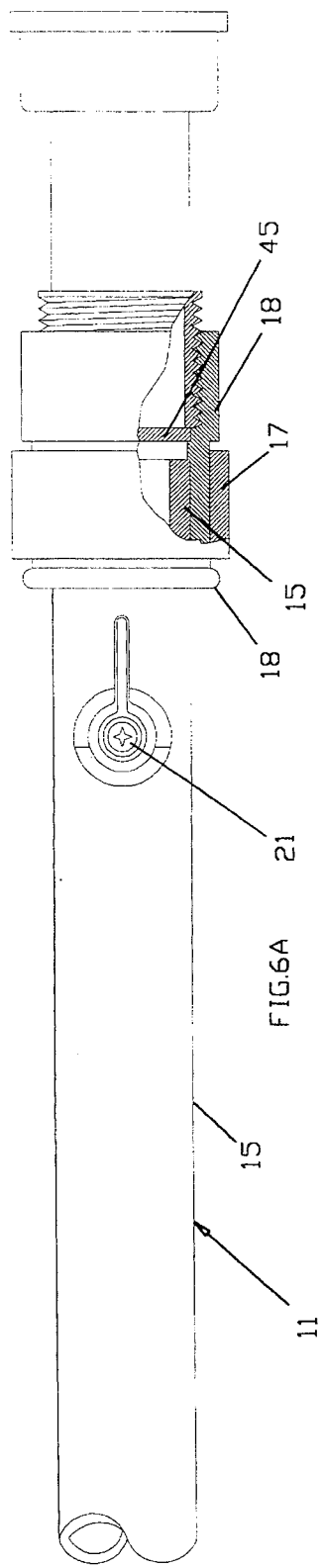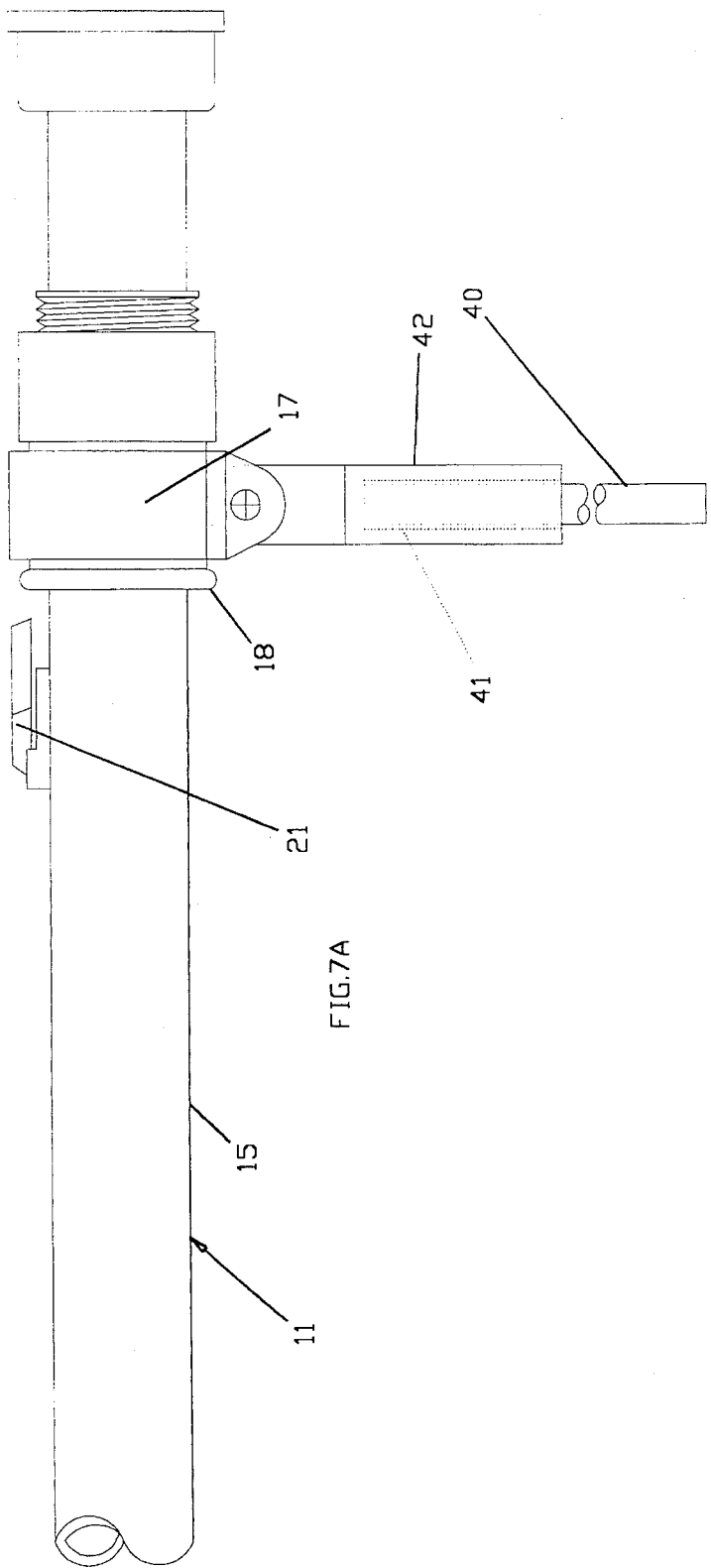

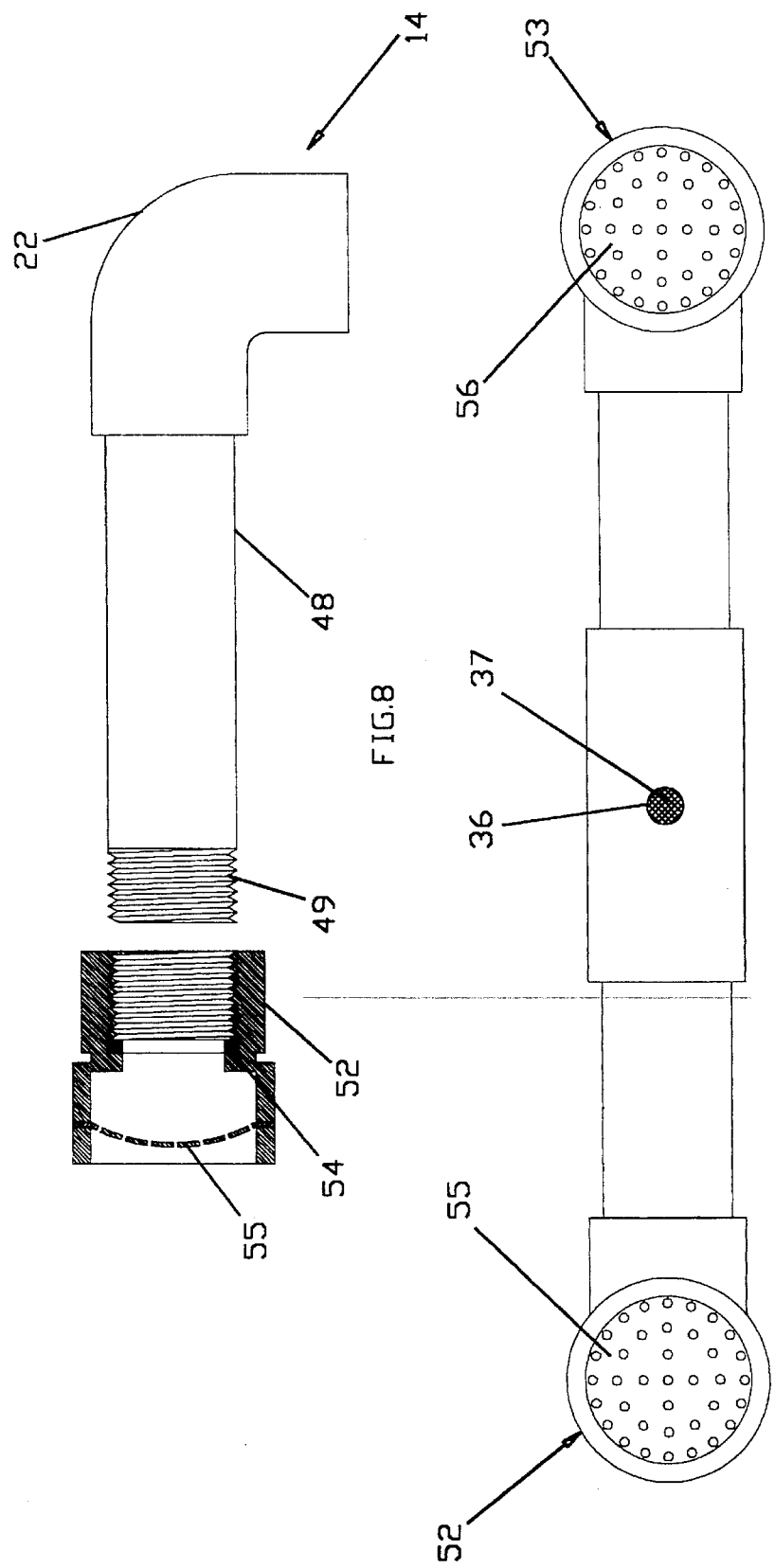

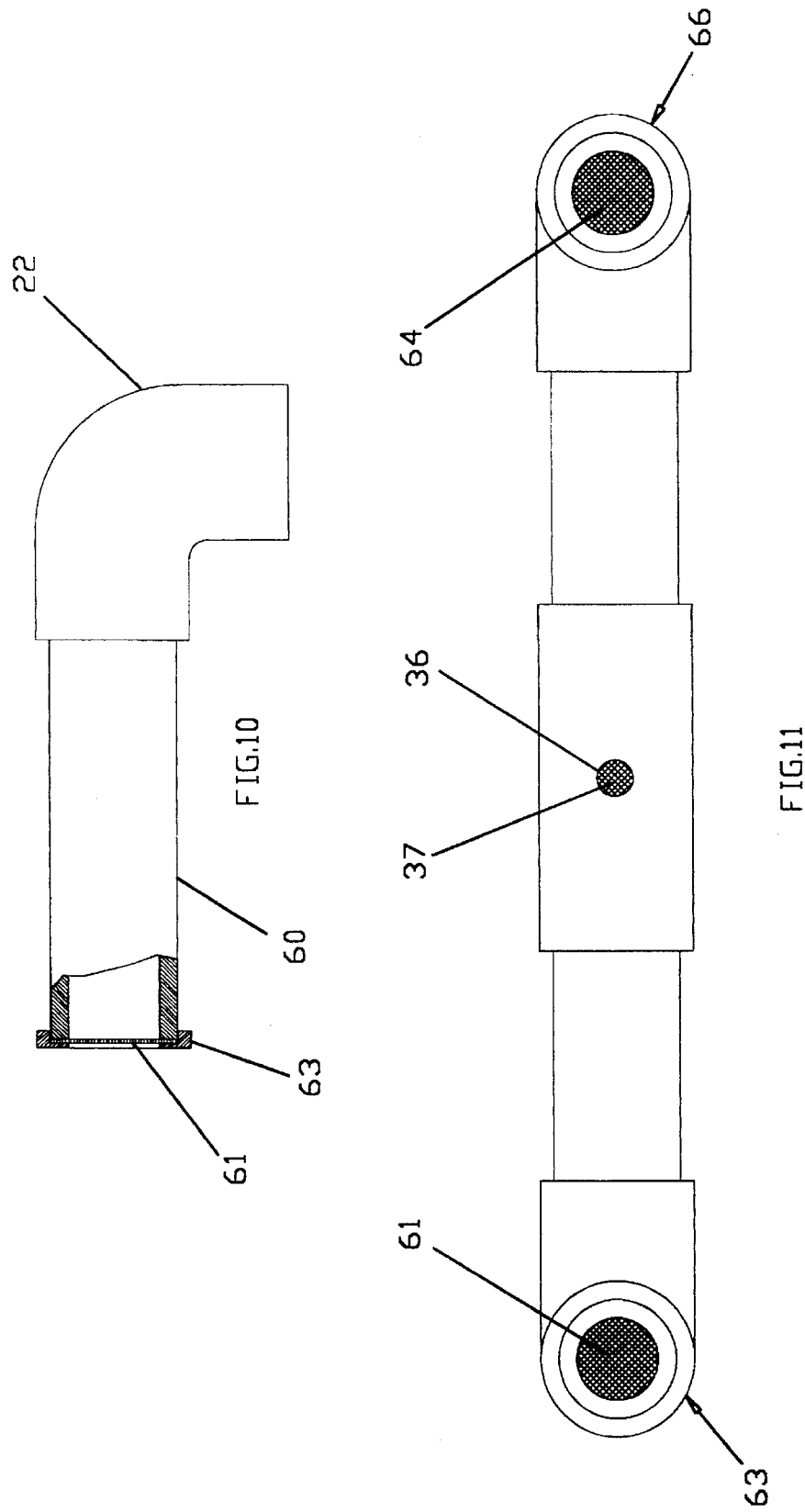

5,556,032

DUAL LEVEL WATERING DEVICE

BACKGROUND OF THE INVENTION

1. Field of the Invention

This invention relates to a watering device and more particularly to a system for watering such objects as trees, shrubs and the like, the device having a plurality of water pressure restraining outlets spaced at, at least two distinct levels above the ground for permitting unattended watering of said objects at ground level or above ground level.

2. Description of the Prior Art

Heretofore, devices for dispensing large volumes of water have been directed to either fixed assemblies for floor or slab washing or portable devices such as lawn sprinklers or irrigation equipment. These devices, although supported above either the ground or a level platform have orifices for water outlets and require bending down or standing around on the part of the user. For example, U.S. Pat. No. 1,103,786 to Lewis concerns a floor washing device which includes a "T"-shaped body formed of rigidly interconnected pipes and supported by at least three legs of equal length so as to space the body a selected distance above the surface to be washed. The front side of the crossmember of the "T" is provided with a plurality of discharge openings for discharging water downwardly and forwardly.

U.S. Pat. No. 2,792,257 to Davis discloses an elongated staff having a pointed end which functions as a ground stake and cooperating brackets for connecting the-stake and a vertically adjustable water conducting pipe. The staff can be supported for unattended sprinkling by a pair of hingedly connected legs which are detachably connected to the upper end of the staff.

U.S. Pat. No. 2,939,666 to Ohre concerns a stabilizer for portable irrigation equipment which includes a rigid "A" frame formed from a single piece of tubular material, bent to the desired angle, and a cross bar. A bracket having parallel arms which are adapted to receive and hold a riser is secured to the "A" frame. A pair of sprinkler heads is deployed at the upper end of the riser.

It can readily be appreciated that these references, either singly or in combination, do not suggest or infer the watering device of the present invention which has at least three water discharge outlets in the support members, which is easily balanced and stored, and which can be set at the base of trees, flowers, roots and other objects requiring continual watering. Reviewing the cited U.S. patents, in Davis, the tripod formed by solid member 8 and legs 64 and 66 are used solely for support of pipe 32 which is sometimes treated as a water conducting conduit. The floor washing device in Lewis is a cumbersome arrangement of pipes not suited for lawn or tree watering and, in addition, legs 3 serve only to support the device about six inches above the floor. The stabilizer in Ohre serves only to vertically support a riser 28 at the top of which is a rotary sprinkler head 30.

SUMMARY OF THE INVENTION

Accordingly, it is an object of the invention to provide a device for uniformly distributing, as well as conserving, water which does not require bending over or standing while watering yet is easily balanced and stored.

It is another object of the invention to provide such a device or arrangement wherein water is distributed at, as well as above, ground level through a plurality of discharge outlets.

It is still a further object of the invention to provide a garden or landscape detail watering device wherein the flow of water is controllable at the unit and the unit is sufficiently sturdy to be used simultaneously as an arm rest.

The foregoing objects are realized by the present invention in a system wherein a main water supply line carries water to a main discharge header having a plurality of outlets for distribution to the objects to be watered. The header includes at least a pair of distribution conduits spaced to form at least two preferably parallel legs of a triangular support, each conduit having a flow restraining means disposed above but adjacent to the ground. The main header is provided with a central restraining means of smaller diameter disposed intermediate the distribution conduits and spaced from the ground to provide water and reduce the water pressure at the pair of outlets. The header and conduit restraining means preferably are mesh filters or multiple screen filters to provide a uniform flow of water therethrough. A support arm preferably made of a suitable metal is connected to the main water supply line at a swivel joint remotely positioned from the header to form a supporting triangle in the main embodiment. A water control valve is positioned in the main water supply line either before or after the point of connection of the swivel joint.

BRIEF DESCRIPTION OF THE DRAWINGS

The foregoing and further objects of the invention will become apparent from reading the following detailed description of preferred embodiments of the invention, in which:

FIG. 1 is a plan view of the invention partly cutaway.

FIG. 2 is an end elevation of the header portion shown in FIG. 1.

FIG. 3 is a side elevation of the embodiment shown in FIG. 1.

FIG. 4 is an exploded view, partly in section of the flow control portion of the embodiment shown in FIG. 1.

FIG. 5 is a side elevation partly cutaway, of the flow control portion of the embodiment shown in FIG. 4.

FIG. 6A is a plan view, partly in section, of an alternate embodiment of the invention shown in FIG. 8.

FIG. 7A is a plan view, partly cutaway, of the embodiment shown in FIG. 6A.

FIG. 8 is an exploded plan view, partly in section, of an alternate embodiment of one sprinkler head extension of the header shown in FIG. 1. shown in FIG. 8.

FIG. 9 is an end elevation of the header of the embodiment shown in FIG. 8.

FIG. 10 is an exploded view, partly in section, of another alternate embodiment of one sprinkler head extension of the header shown in FIG. 1.

FIG. 11 is an end elevation of the header of the embodiment shown in FIG. 10.

DETAILED DESCRIPTION OF THE INVENTION

Figure 3A:
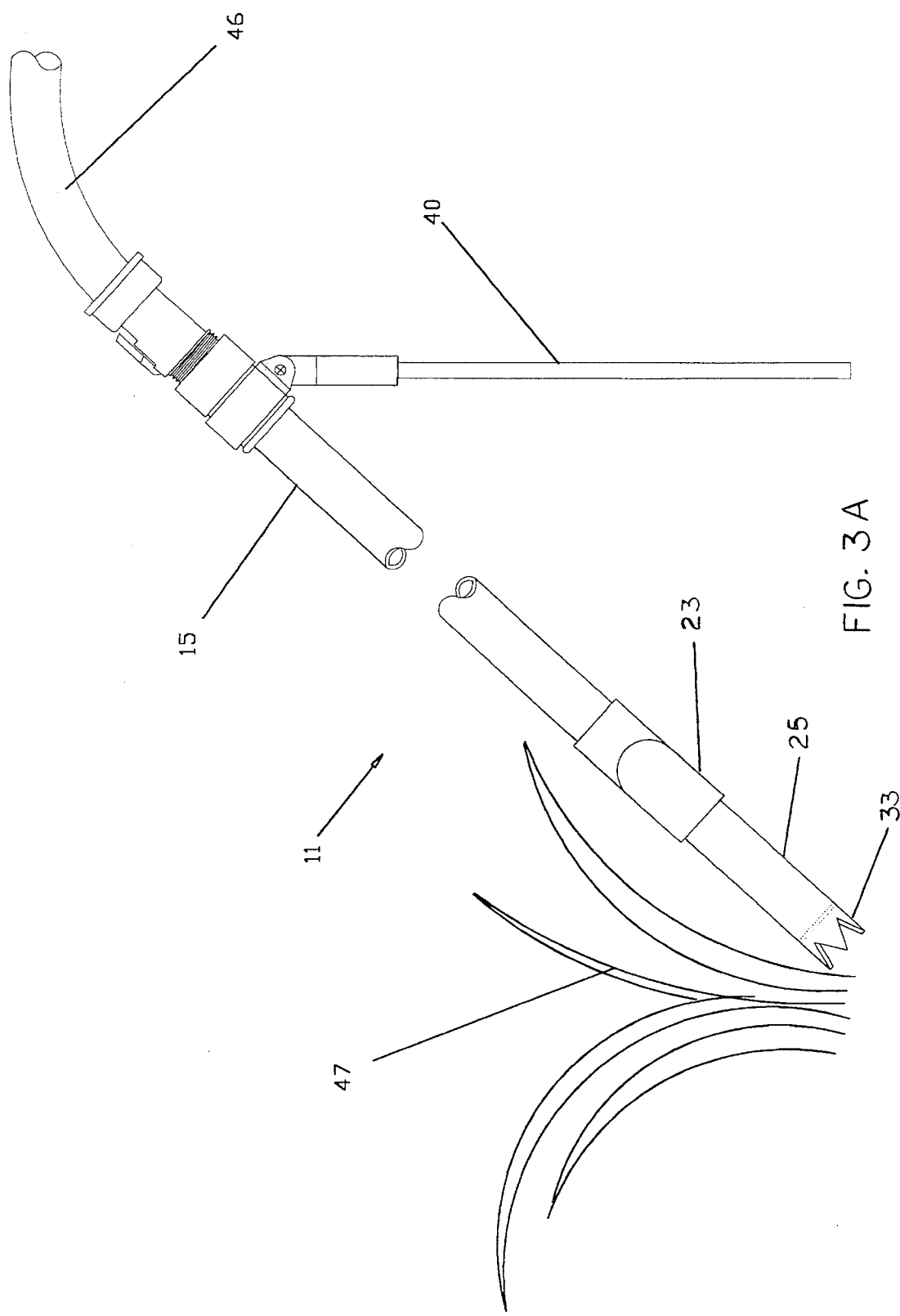
FIG. 3A is a side elevation of the invention, set-up in a watering position.

Turning now to the drawings, and particularly to FIGS. 1–3, there is shown a preferred embodiment of the water saver of the invention 10 comprising a flow control section 11 for regulating the flow of water into the system, and a header section 14 for controlling the pressure of, and distributing water to, the desired locations. Control section 11 includes a main water supply line 15 having as assembly components a 360° swivel ring 17, a retaining shoulder fitting 18 for the swivel ring 17, a water hose coupling 19 and an inlet control valve 21.

"Header section 14 selectively distributes water through a pair of equally spaced elbow joints 22 and 23 and water distribution conduits 24 and 25 to a pair of flow restraining means 28 and 29 which may be made of mesh or fine screen or the like being of such a size as to allow a major portion of the water flowing through the header section 14 to be distributed through the distribution conduits 24 and 25, and a respective pair of outlets 32 and 33." The ends of conduits 24 and 25 are shown in FIG. 2 notched as indicated at 32 and 33, to facilitate watering close to the ground. An outlet 36 in header 14 is covered with a mesh or other restraining means 37 to further distribute water as well as to reduce the pressure at the other outlets.

FIG. 3A shows the device 10 supported preferably at swivel ring 17 by a support rod 40 that is received in a socket 41 in a swivel attachment 42 and pivots about a swivel rivet 43. Supply line 15 and other water conducting means are preferably made of PVC piping.

Figures 6, 7:
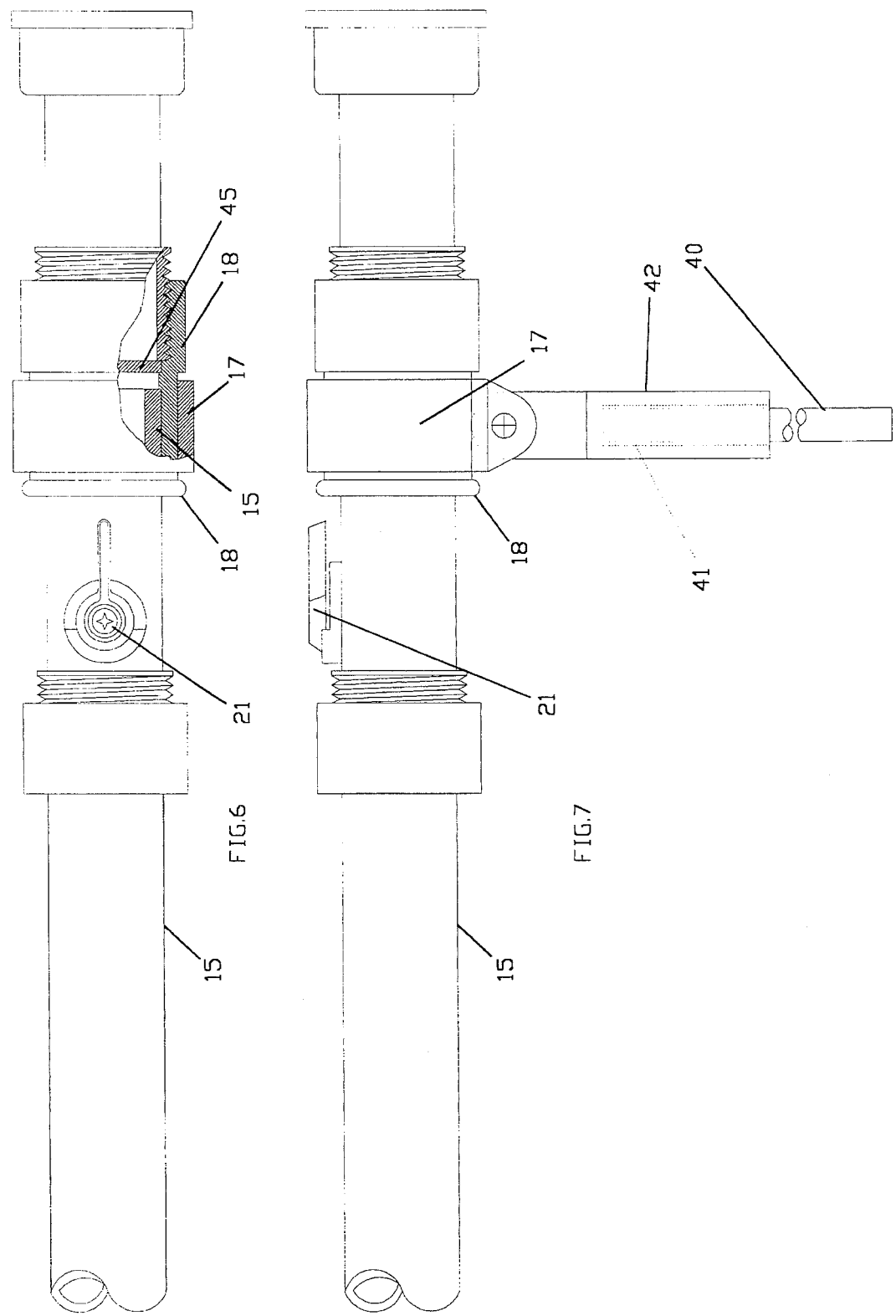
FIG. 6 is a plan view, partly in section, of an alternate embodiment of the invention shown in FIG. 1.
FIG. 7 is a side elevation, partly cutaway, of the embodiment shown in FIG. 6.

FIGS. 4 and 5 illustrate, partly in section, the support means of FIGS. 1 and 2 and, more particularly, the manner in which swivel ring 17 is joined to the main water supply line, including a rubber washer 45. In the alternate embodiment of FIGS. 6 and 7, water control valve 21 is shown displaced to the opposite side of swivel ring 17, while in FIGS. 6A and 7A, the water control valve 21 is mounted directly in the main water supply line.

FIG. 8 discloses yet another embodiment of the invention wherein an alternate conduit 48 is connected to header 14 at elbow joint 22, this conduit being threaded as indicated at 49 to receive a sprinkler head 52. A conventional seal such as a rubber washer 54 is inserted as shown, and a perforated sprinkler attachment such as a nozzle 55 for distributing a uniform spray of water, complete the arrangement. In FIG. 9, sprinkler head 52 and nozzle 55 are shown in end elevation paired with a head 53 and a nozzle 56, depicting their relationship with outlet 36 and filtering means 37. FIGS. 10 and 11 illustrate a further embodiment of the invention wherein a conduit 60, connected to elbow joint 22 terminates in a filtering means such as a mesh 61 which is secured by a cap 63. In the end elevation of FIG. 11, a related mesh 64 and a cap 66 are shown to complete this arrangement.

In operation, header 14 is inclined at a selected angle to the ground or other surface by support rod 40, which may be any one of several lengths, and which is inserted into attachment 41, in the manner shown in FIGS. 3, 5, 7, and 7A. The alternate filtering means may be employed as special circumstances require, as may be the positioning of the water control valve 21. Once the device 10 is set in place, it may be left unattended due to the avoidance of reverse thrust from a conventional sprinkler nozzle. The rate of water flow from the unit may be controlled regardless of the force of local water pressure, and the placement of water control valve 21 may be chosen in regard to the circumstances of use. The device is especially efficient in water use when set at the base of trees for watering their roots, among other uses. The gardener may simply place the device 10 in the position to be watered, turn the control valve 21 to the on position, and walk away to perform other chores. In addition to saving water, by a more efficient method of applying water directly to the roots, the gardener does not have to stand in one position for a length of time, thus saving strain on the gardener's back and legs.

Although this invention has been disclosed and described generally in relation to a preferred embodiment, its principles are susceptible to other applications which will be apparent to persons skilled in the art. For example, couplings 22 and 23 may be rotated downwardly, selectively to vary the angle at which water is directed toward the ground in combination with the length of support rod 40. Thus, many modifications, additions, and deletions may be made to the invention without departure from the scope of the invention as set forth in the following claims.

What is claimed is:

1. A watering device for delivering a uniform flow of water through a plurality of discharge outlets comprising:

an elongate pipe having a first end and a second end for accommodating water pressure therethrough, a coupling at said first end of said pipe for connection to a pressurized flow of water, a header connected to said pipe at said second end remote from said coupling, at least two spaced water distribution conduits connected to said header and extending outwardly thereof, a water flow restraining means secured in said distribution conduits adjacent the ends thereof remote from said header, a control valve in said elongate pipe adjacent said coupling, a support means including a swivel attachment connected to said pipe adjacent said control valve so that said at least two distribution conduits and said support means form a triangular support for said watering device, an opening in said header intermediate said at least two distribution conduits, and a flow restraining means secured in said opening for providing an additional watering outlet, said flow restraining means in said header of such size as to allow a major portion of the water moving through said header to be distributed through said at least two distribution conduits, said at least two distribution conduits disposed parallel to said elongate pipe and equally spaced therefrom along said header, a swivel ring rotatably secured to said swivel attachment and mounted on said elongate arm, said control valve positioned intermediate said coupling and said swivel ring, said flow restraining means in said header of such size as to allow a major portion of the water moving through said header to be distributed through said at least two distribution conduits, said elongate pipe and said at least two distribution conduits made of PVC and said support means made of a suitable metal, and said at least two distribution conduits notched at their ends to allow greater distribution of water and more securely contact the ground, whereby said watering device may be placed at any desired location and left unattended while a selected uniform water supply is delivered through said at least two distribution conduits, and the flow restraining means in said header provides additional watering while selectively reducing the water pressure at said flow restraining means in said distribution conduits.

\* \* \* \* \*